United States Patent [19]

Ohtsuka et al.

[11] Patent Number: 4,825,114
[45] Date of Patent: Apr. 25, 1989

[54] ASSEMBLY OF AXIAL FAN MOTOR

[75] Inventors: Shigeru Ohtsuka, Yonago; Seiichi Tsukutani, Sakaiminato, both of Japan

[73] Assignee: Matsushita Electric Industrial Co., Ltd., Japan

[21] Appl. No.: 156,437

[22] Filed: Feb. 16, 1988

[30] Foreign Application Priority Data

Feb. 17, 1987 [JP] Japan .............................. 62-21605[U]

[51] Int. Cl.$^4$ .............................................. H02K 5/16
[52] U.S. Cl. ........................................ 310/90; 310/258
[58] Field of Search ................. 310/90, 254, 256, 258, 310/259, 180, 43

[56] References Cited

U.S. PATENT DOCUMENTS

| | | | |
|---|---|---|---|
| 3,701,912 | 10/1972 | Schulze | 310/90 |
| 4,224,544 | 9/1980 | McKinnon et al. | 310/90 |
| 4,337,405 | 6/1982 | Hishida | 310/43 |
| 4,682,065 | 7/1987 | English et al. | 310/90 |
| 4,686,400 | 8/1987 | Fujisaki et al. | 310/90 X |
| 4,716,648 | 1/1988 | Nel | 310/258 X |

Primary Examiner—William M. Shoop, Jr.
Assistant Examiner—Marc S. Hoff
Attorney, Agent, or Firm—Lowe, Price, LeBlanc, Becker & Shur

[57] ABSTRACT

An axial fan motor comprising a cylindrical bearing boss having therein a bearing mechanism for supporting a rotational shaft of the axial fan motor and a stator core coupled to the cylindrical bearing boss is disclosed. The bearing boss is, at its one end portion, coupled integrally to an insulator so that said stator core is sandwiched between the insulator and another insulator so as to insulating the stator core. A stator-holding section is defined in a housing of the axial fan motor and the stator-holding section has a cylindrical bearing boss receiving portion whose axis is substantially coincident with the axis of the rotational shaft of the axial fan motor. The bearing boss receiving portion includes upper and lower engaging portions which are engaged with the bearing boss when the bearing boss is inserted into the bearing boss receiving portion so that the upper engaging portion carries the stator core through the insulator and the lower engaging portion engages with the other end portion of the bearing boss.

7 Claims, 3 Drawing Sheets

ASSEMBLY OF AXIAL FAN MOTOR

BACKGROUND OF THE INVENTION

The present invention relates generally to an axial fan motor which may be applicable particularly, but not exclusively, to cooling of electronic devices.

Recently, electronic devices are being designed at high density for size and weight reduction purposes and, concurrently with this high-density design of the electronic devices, commutatorless direct-current axial fan motors are increasingly used in order to prevent resultant heat-generation of the electronic device. An important problem in provision of the axial fan motor relates to cost-reduction and therefore improvement is being made in terms of high-density mounting of a drive circuit, integration of parts and so on.

A fan motor of this type as is known in the art comprises a stator assembly including a stator core, a drive winding and a circuit board assembly, and is so constructed that the stator assembly is inserted into a boss section resin-formed integrally with a stator-holding section and then fixed with an adhesive. However, use of the adhesive for connection of the stator assembly to the boss section would require severe control and treatment with respect to irregularity of the adhesive application amount, drying time and drying temperature etc., to ensure reliability of the fan motor and of prevent contamination due to the adhesive itself. This results in difficulty being encountered to reduce steps for manufacturing.

SUMMARY OF THE INVENTION

It is therefore an object of the present invention to provide a new and improved axial fan motor which is capable of allowing reduction of parts, reduction of manufacturing steps and easy control of assembling, thus resulting in cost-reduction.

With this and other objects which will be become apparent as the description proceeds, according to a feature of the present invention, a bearing boss section and an end-insulator are formed integrally with a resin and an engaging portion of the bearing boss section is engaged with a bearing boss receiving portion of a stator-holding section whereby a stator assembly is supported by the end-insulator and the engaged portion of the bearing boss receiving portion. The bearing boss receiving portion has a step portion recessed stepwise with respect to a surface of the stator-holding section so that the engaging portion of the bearing boss is bent toward the step portion. More specifically, the end-insulator for insulation between the drive winding and the stator core, being made of a thermoplastic resin, is coaxially and integrally coupled to a cylindrical bearing boss made of a thermoplastic resin and arranged therein for receiving bearing elements. The end-insulator formed integrally with the bearing boss section is combined with the stator core so as to create a stator assembly with execution of winding. The outer diameter of the bearing boss is arranged to be in engaging and inserting relation to the diameter of a cylindrical through-hole defined at the center portion of the stator core. Furthermore, the outer diameter of the cylindrical bearing boss also has a dimension so as to be inserted into a bearing boss receiving portion of the stator holding section.

When the cylindrical bearing boss is inserted into the bearing boss receiving portion of the stator holding section, the stator assembly is positioned and carried by engagement of the end-insulator with one engaging portion of the bearing boss receiving portion and one end portion of the bearing boss is engaged with the step portion of the bearing boss receiving portion, resulting in holding and supporting of the stator assembly. Since the bearing boss and the receiving portion are made of a thermoplastic resin, the step portion of the receiving portion and the one end portion of the bearing boss are easily welded to each other by means of heat-processing or the like. Furthermore, the insulator and bearing boss are integrally formed with each other and therefore, this results in easy positioning and supporting of the stator assembly.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1A:
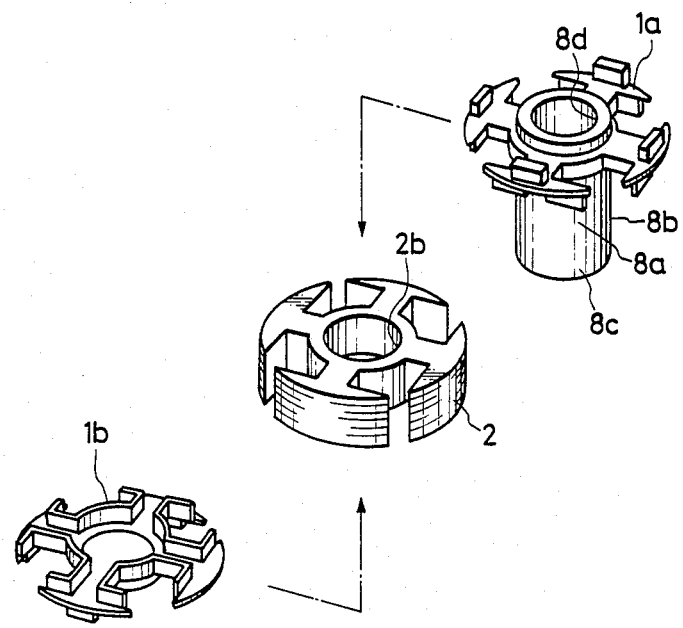
FIGS. 1A and 1B are exploded views of a stator assembly of an axial fan motor according to the present invention.
Figure 1B:
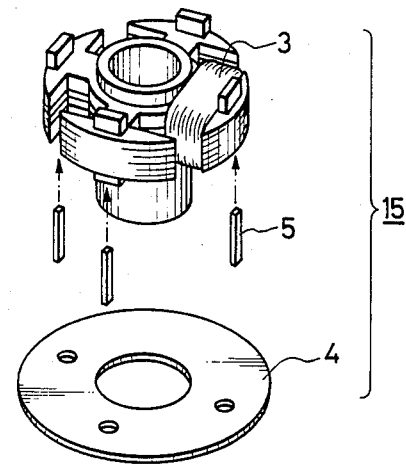
Figure 2A:
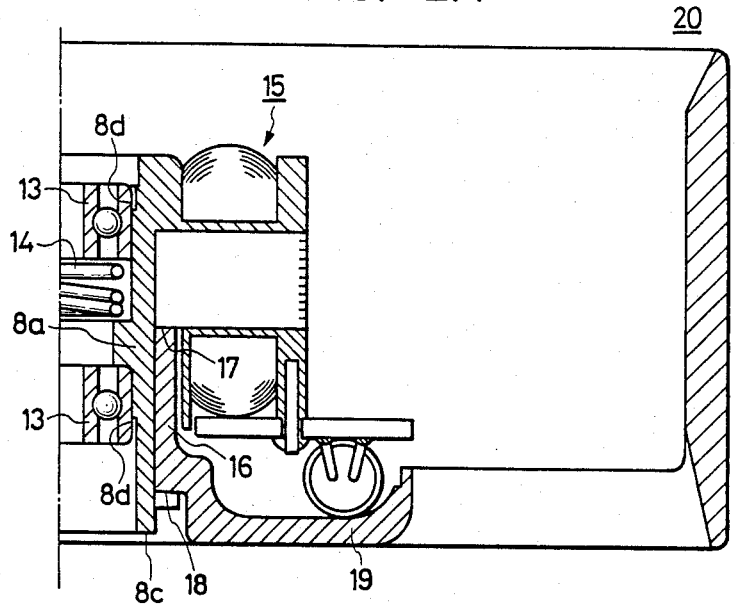
FIG. 2A is a cross-sectional view showing the state in which the stator assembly is built in a stator-holding section defined in a housing of the axial fan motor according to an embodiment of the present invention.
Figure 2B:
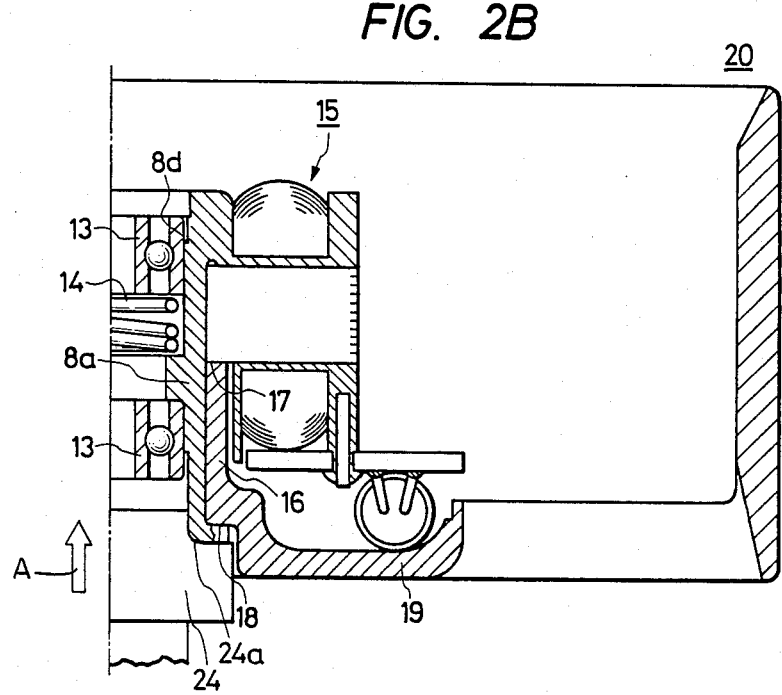
FIG. 2B is an illustration for describing a connection between the stator assembly and a bearing boss receiving portion of the stator-holding section.

Referring now to FIGS. 1 to 2B, there is illustrated an axial fan motor according to an embodiment of the present invention. In FIG. 1 which is an exploded and perspective view showing an stator assembly of a commutatorless direct-current axial fan motor according to the embodiment, a cylindrical bearing boss portion 8a and an upper end-insulator 1a made of a thermoplastic resin are formed integrally with each other with the bearing boss portion 8a arranged such that its outer-circumference portion 8b can be tightly inserted under pressure or loosely fitted into a cylindrical through-hole 2b defined at the center portion of a stator core 2. The stator core 2 is positioned to be interposed between the upper end-insulator 1a and a lower end-insulator 1b and, after a winding 3 is made therearound, coupled through pins 5 to a circuit board assembly 4 by means of soldering so as to make up a stator assembly 15.

FIG. 2A is a cross-sectional view showing a state that the constructed stator assembly 15 is built in a stator-holding section 19 defined in a housing 20. The stator assembly 15 is fitted under depression in a bearing boss receiving portion 16 of the stator-holding section 19 and positioned with an upper engaging portion 17 of the bearing boss receiving portion 16. In this build-in state, one end 8c of the bearing boss portion 8a is arranged to protrude from a lower engaging portion 18 of the bearing boss receiving portion 16, formed annularly along the circumference of the bearing boss section and recessed stepwise with respect to a surface of the stator-holding section, and is welded to the periphery of the lower engaging portion 18 by means of a known welding method such as ultrasonic wave welding and heat welding so as to perform a connection between the stator-holding section 19 and the stator assembly 15. Here, it is preferred that the bearing boss section 8a and the bearing boss receiving portion 16 are made of resins so as to make easy the connection therebetween by means of the heat-processing.

FIG. 2B shows one example of the preferred method of connection therebetween. As shown in FIG. 2B, a die 24 stepped with a curved portion 24a is inserted under depression into the bearing boss section 8a from a direction indicated by an arrow a so that the end portion 8c of the bearing boss section 8a is curved along the curved portion 24a by means of the ultrasonic wave vibration method and then welded to the stepped portion 18. Thereafter, a pre-loaded spring 14 and bearings 13 are set in the bearing boss section (8d). Here, although in the above description the bearing boss section 8a is integrally formed with the upper end-insulator 1a, it is also appropriate that it is integrally formed with the lower end-insulator 1b, because it is fixed by means of the drive winding to allow the connection between the stator assembly 15 and the stator-holding section 19.

Figure 3:
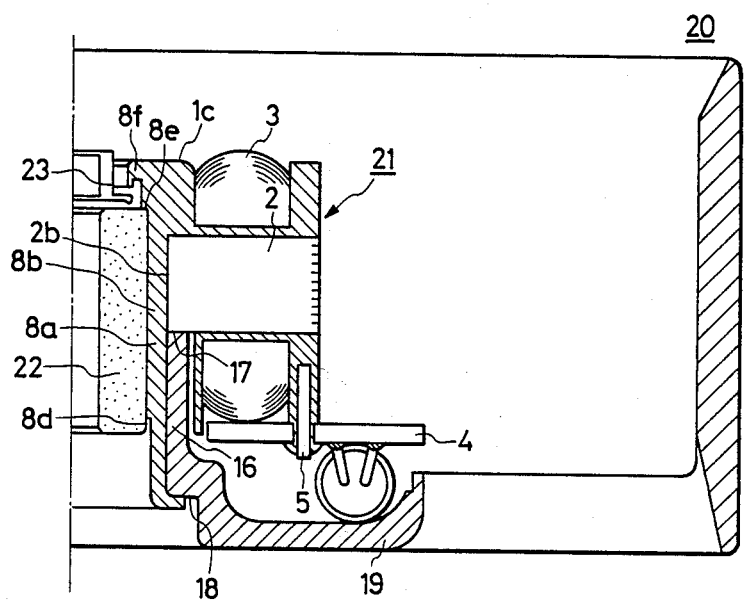
FIG. 3 is a cross-sectional view showing a modification of the present invention.

FIG. 3 is a cross-sectional view showing another embodiment of the present invention. A stator core 2 and an end-insulator 1c are constructed integrally in advance by means of the insertion form and coupled to a bearing boss section 8a whose outer diameter is equal to the diameter of a cylindrical through-hole 2b of the stator core 2. A winding 3 is turned out around the stator 2 which is in turn connected through connector pins 5 to a circuit board assembly 4 by means of soldering so as to create a stator assembly 21. The outer portion 8b of the bearing boss section 8a of this stator assembly 21 is fitted under depression into a bearing boss receiving section 16 of a housing 20. At this time, the stator assembly 21 is positioned by an upper end 17 of the bearing boss receiving section 16. Thereafter, an end portion 8c of the bearing boss section 8a, being protruded with respect to the other end 18 of the bearing boss receiving section 16 when fitted thereinto, is bent toward the other end 18 thereof and welded thereto by means of a ultrasonic processing or heat processing, resulting in connection between the stator assembly 21 and the stator-holding section 19. After this, an oil-containing bearing 22 and an oil thrower 23 are fitted into the bearing boss section 8a. Here, it is appropriate that, on the inside 8d of the bearing boss section 8a, a projection portion 8e is provided for positioning the oil-containing bearing 22 and an oil return 8f is provided for prevent oil-leakage.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention. For example, it is appropriate that, as shown in the drawings, if there is the possibility of expansion due to the ultrasonic wave processing or the heat processing, the inner diameter of the end portion 8c of the bearing boss section 8a is enlarged in advance as compared with that of the other portions.

What is claimed is:
1. An axial fan motor comprising:
a housing;
cylindrical bearing boss means having at an inner portion thereof a bearing mechanism for supporting a rotational shaft of said fan motor, said bearing boss means integrally having, at its one end portion, an insulator means;
a stator core coupled to said bearing boss means so as to be insulated by said insulator means, winding means disposed around said stator core; and
a stator-holding section in said housing, said stator-holding section having a cylindrical bearing boss receiving portion whose axis is substantially coincident with the axis of said rotational shaft of said axial fan motor, said bearing boss receiving portion having upper and lower engaging portions engaging with said bearing boss means with said rotational shaft of said axial fan motor being supported by said bearing mechanism provided in the inner portion of said bearing boss means to axially support said bearing boss means.

2. An axial fan motor as claimed in claim 1, wherein said insulator means comprises upper and lower insulators between which said stator is interposed coaxially and at least one of said upper and lower insulators being integral with said bearing boss means.

3. An axial fan motor as claimed in claim 1, wherein said upper engaging portion of said bearing boss receiving portion is arranged to axially carry said stator and said lower engaging portion is arranged to be engaged with the other end portion of said bearing boss means.

4. An axial fan motor as claimed in claim 3, wherein said lower engaging portion of said bearing boss receiving portion is recessed stepwise with respect to the lower surface of said stator-holding section.

5. An axial fan motor as claimed in claim 4, wherein the other end portion of said bearing boss means includes a bent portion boss receiving portion are engaged with each other by bending the other end portion extending toward in welded contact with said lower engaging portion.

6. An axial fan motor as claimed in claim 4, wherein said bearing boss means and said bearing boss receiving portion are made of a thermoplastic resin.

7. The axial fan motor of claim 1, wherein said bearing boss receiving portion is integral with the housing.

* * * * *